Nov. 6, 1923.
A. KÖNIG
1,473,374
METHOD OF AND APPARATUS FOR MAKING SAWS OR SAW BLADES
Original Filed June 29, 1918    4 Sheets-Sheet 1
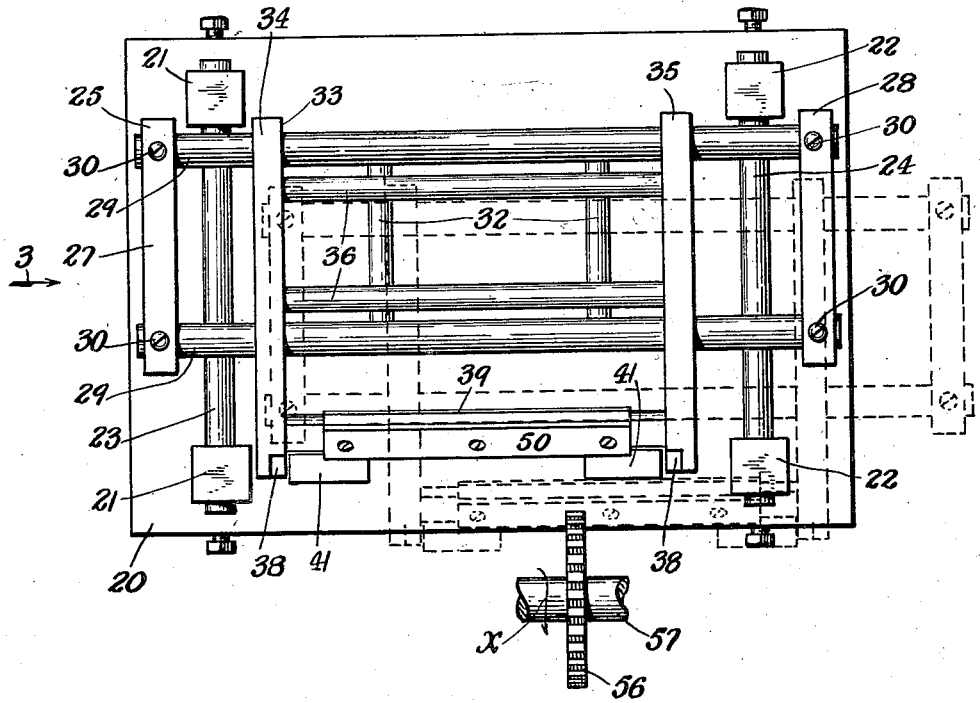
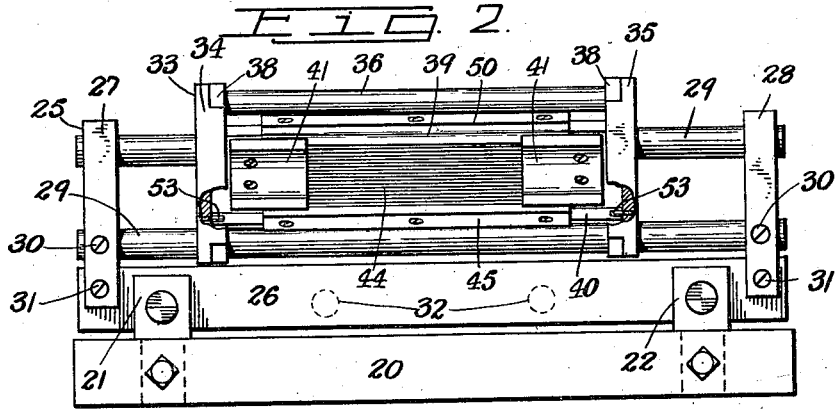
INVENTOR
Adolf König
BY
ATTORNEYS Nov. 6, 1923.
A. KÖNIG
1,473,374
METHOD OF AND APPARATUS FOR MAKING SAWS OR SAW BLADES
Original Filed June 29, 1918   4 Sheets-Sheet 2
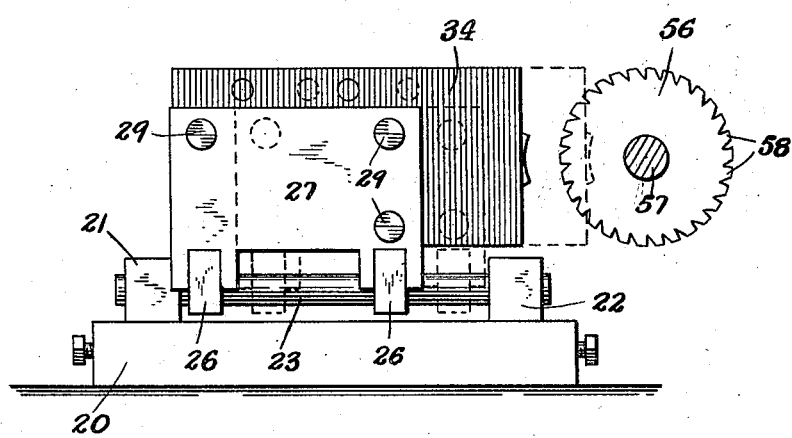
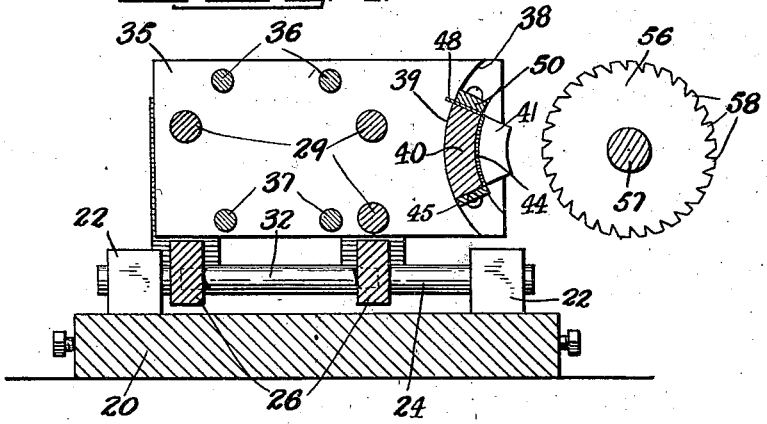
INVENTOR
Adolf König,
BY
Edgar Tate & Co.
ATTORNEYS

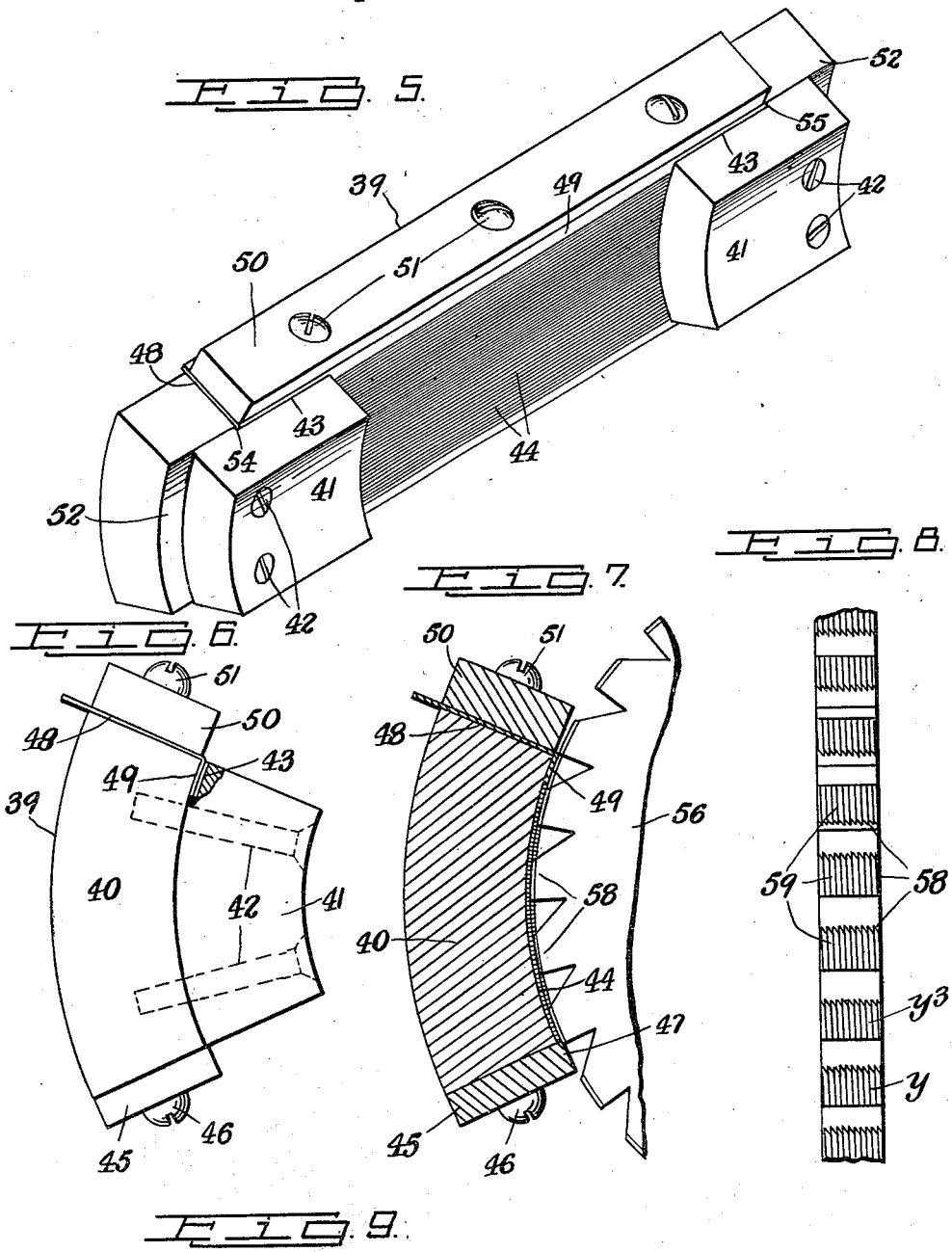

Nov. 6, 1923.
A. KÖNIG
1,473,374
METHOD OF AND APPARATUS FOR MAKING SAWS OR SAW BLADES
Original Filed June 29, 1918   4 Sheets-Sheet 4
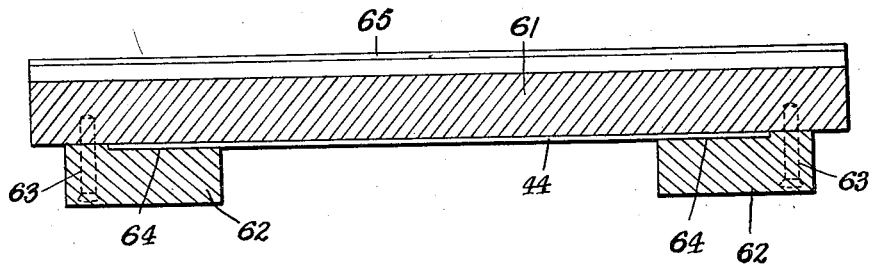
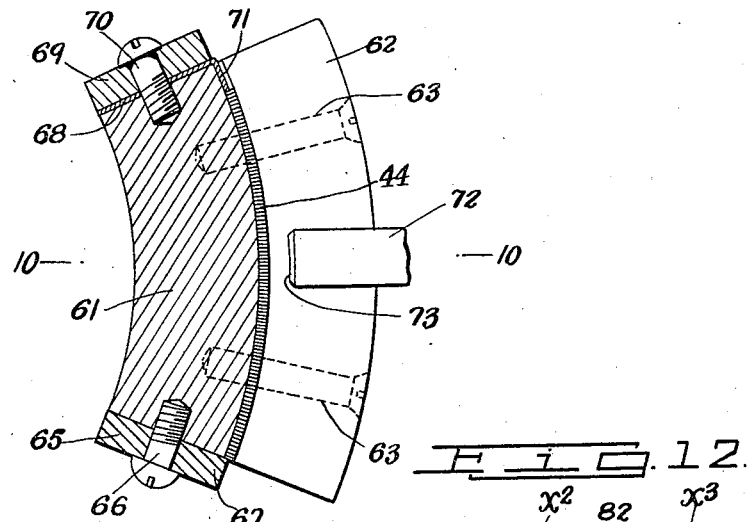
Inventor
Adolf König,
By his Attorneys Patented Nov. 6, 1923.

1,473,374

UNITED STATES PATENT OFFICE.

ADOLF KÖNIG, OF HOBOKEN, NEW JERSEY, ASSIGNOR TO HANS K. LORENTZEN, OF NEW YORK, N. Y.

METHOD OF AND APPARATUS FOR MAKING SAWS OR SAW BLADES.

Application filed June 29, 1918, Serial No. 242,550. Renewed April 6, 1923.

*To all whom it may concern:*

Be it known that I, ADOLF KÖNIG, a citizen of the United States, and residing at Hoboken, in the county of Hudson and State of New Jersey, have invented certain new and useful Improvements in Methods of and Apparatus for Making Saws or Saw Blades, of which the following is a specification, such as will enable those skilled in the art to which it appertains to make and use the same.

This invention involves both a method of, and apparatus for making saw blades and the object thereof is to provide a device or apparatus of this class, which may be used in connection with an ordinary milling machine, or with a lathe, or with a planing machine, or any other machine or apparatus of a similar class or classes; a further object being to provide a device or apparatus of the class specified particularly designed for making what are known as jewelers' saws, or saw blades, but which may also be used in making ripsaws, hack saws and other saws or saw blades of similar types; a still further object being to provide a device or apparatus of the class specified by means of which a large number of saws or saw blades may be made at one time, or at one operation, whereby a large number of saws may be produced in the time heretofore necessary for producing one saw, or saw blade, and whereby the cost of manufacturing devices of the class specified will be reduced to a minimum; and with these and other objects in view the invention consists in a device or apparatus of the class and for the purpose specified, constructed and operating as hereinafter described and claimed, and in the method of producing saws or saw blades herein set out.

The invention is fully disclosed in the following specification, of which the accompanying drawings form a part, in which the separate parts of my improvement are designated by suitable reference characters in each of the views, and in which:—

Fig. 1 is a plan view of my improved saw making device or apparatus and indicating the method of its use;

Fig. 2 a front view of the device or apparatus shown in Fig. 1 with part of the construction broken away and showing only said device or apparatus;

Fig. 3 an end view looking in the direction of the arrow 3 of Fig. 1;

Fig. 4 a transverse sectional view of the device;

Fig. 5 a perspective view of a workpiece holder and carrying member forming part of my device or apparatus;

Fig. 6 an end view of the workpiece holder shown in Fig. 5 but on an enlarged scale, and with part of the construction broken away;

Fig. 7 a transverse sectional view of the workpiece holder shown in Figs. 5 and 6, and showing also a cutter which I employ;

Fig. 8 a face view of the cutter shown in Fig. 7;

Fig. 9 a sectional diagrammatic view showing the cutter and a workpiece from which a saw is made and indicating the method of the operation;

Fig. 10 a longitudinal section of a workpiece holder shown in Fig. 11, the section being on the line 10—10 of said figure;

Fig. 11 a view similar to Fig. 7 but showing the modified form of workpiece holder;

Fig. 12 a view similar to Fig. 11 but showing another modification;

Fig. 13 a view showing different forms of teeth employed on the cutter shown in Figs. 7 and 8; and, Fig. 14 a side view of a part of a saw indicating the method of forming the different teeth thereon by means of the separate tool cutter teeth shown in Fig. 13.

In the accompanying drawings Figs. 1 to 9 inclusive show one form of my improved device or apparatus for use in making saws, and this form of said device or apparatus is designed for application to, or for use in connection with, ordinary milling machines, lathes, turning machines and the like, and in the accompanying drawings is shown constructed in the following manner.

In the practice of my invention, as shown in Figs. 1 to 9 inclusive, I provide a base plate or support 20 on which the operative parts and details of the construction are mounted, and secured to the top of said plate adjacent to the corners thereof are two pairs of keepers 21 and 22. Mounted in the keepers 21 is a rod 23, and mounted in the keepers 22 is a rod 24. The rods 23 and 24 range forwardly and backwardly and mounted thereon and movable longitudinally thereof is a main operative frame 25, comprising two parallel bars 26 which range transversely of the machine and through which the rods 23 and 24 pass, and vertical end plates 27 and 28 mounted on the end portions of said bars, and connected by three parallel rods 29, as clearly shown in Figs. 1 and 4, said rods being held in place or in connection with said plates by set screws 30, and the plates are held in connection with the bars 26 by set screws 31, as shown in Fig. 2, and the bars 26 are connected intermediate of the ends thereof and at spaced intervals by forwardly and backwardly directed rods 32 as clearly shown in Fig. 1.

Mounted on and movable longitudinally of the rods 29 which constitute a part of the main frame 25 is a supplemental operative frame 33 consisting of end plates 34 and 35 connected at the top and bottom by connecting rods 36 and 37 respectively, as clearly shown in Fig. 1. The forwardly directed portions of the plates 34 and 35 are provided on their inner faces with arc-shaped recesses 38 which open upwardly and downwardly through said plates, this construction being clearly shown in Figs. 2 and 4.

The above construction consisting of a base 20 and the main and supplemental frames mounted thereon and movable transversely and longitudinally thereof, constitute one apparatus or device for supporting or carrying the workpiece holder or carrying member 39, which is clearly shown in detail in Figs. 5 to 7 inclusive, and consists of a concavo-convex elongated body 40 to the convex face of which is secured at a predetermined distance from the ends thereof concavo-convex keepers 41 which are secured to said body 40 by screws or similar devices 42, and the concave faces of the keepers 41 are reduced as shown at 43 in Fig. 5 to form between said keepers and the concave face of the body 40 a space to receive the end portions of a plurality of saw blade blanks 44 as clearly shown in Figs. 5 to 7 inclusive. The blanks 44 are held against downward movement by a plate 45 secured to the bottom of the body 40 by screws 46 and which extends beyond the concave face of said body as shown at 47 to form a seat for said body and the blanks are held against said seat by an L-shaped sheet metal plate 48, the part 49 of which is adapted to bear on the uppermost blank supported between the body 40 and the keepers 41, and the plate 48 is held in place by a plate or keeper 50 which is secured to the top of the body 40 by screws 51 which also pass through the L-shaped plate 48.

In connecting the keepers 41 to the concave face of the body 40 at a predetermined distance from the ends of said body I form protruding end portions 52 on said body, and these protruding end portions are adapted to pass into the recesses 38 in the plates 34 and 35 as clearly shown in Figs. 1, 2 and 4 of the drawings, and the workpiece carrying holder 39 is adapted to be supported in said recesses centrally thereof by pins 53 secured to the plates 34 and 35 and protruding into the recesses 38 therein. It will be understood that the holder 39 may be inserted into and removed from the supplemental frame 33 or the recesses 38 in the plates 34 and 35 by hand, and the blanks 44 may be placed in and removed from said holder by removing the plate or keeper 50 and L-shaped plate 48 which may permit of the upward movement of the blanks through the concave face of the body 40 and the recess formed by the reduced portions 43 in the keepers 41.

It will be noted that the blanks 44 are of the same, or approximately the same length as the L-shaped plates 48, or said blanks extend from the corner 54 in the reduced portion 43 of one of the keepers 41 to the corner 55 of the other keeper 41 as shown in Fig. 5.

With the means herein described of supporting the workpiece carrying member 39, said member may be moved forwardly and backwardly and transversely as indicated in dotted lines in Fig. 1, and employed in connection with the apparatus as shown in Figs. 1 to 9 inclusive is a rotary cutter 56 shown in Figs. 1, 3, 4, 7 and 8 which is mounted on the arbor or on a shaft 57 connected with the arbor of a milling machine, or on machines of this class as hereinbefore set out. The machine, or the means for operating the shaft 57 has not been shown for the reason that it forms no part of my invention, and any means may rotate the shaft 57 to accomplish the desired result.

The cutter 56 is provided with a plurality of cutting faces 58 having a plurality of thread-like teeth 59 which are arranged on the successive cutting faces in true alinement and with a predetermined pitch, the variation of which will vary the size of and the number of teeth to be cut in the blanks 44. The operation of cutting the blanks is indicated diagrammatically in Fig. 9 of the drawing, and it will be noted that by rotating the cutter 56 in the direction of the arrow $x$ in Fig. 1, after the main frame has been moved forwardly from the position shown in full lines in said figure to bring the cutter into engagement with the right hand end portion of the blanks 44 supported in the holder 39 the cutting of the teeth 60 in said blanks will move the holder 39 and the blanks therein transversely from left to right by the free action of the cutter 56. This operation is indicated in dotted lines in Fig. 1, and it will be understood that when the cutter 56 reaches the left hand end portion of the blanks 44 and the main frame 25 is moved backwardly to clear the cutter 56, the operation of said cutter may be stopped in the usual or any desired manner.

In the above described operation, it is stated that the main frame is moved forwardly and backwardly to bring the blanks 44 into operative relation with the cutter 56, and it will be understood that this operation may be accomplished by hand or controlling levers may be employed, but as my invention is not limited to any specific means for operating the main frame, the same has not been shown or described, and the fact that the said frame may be operated by hand will be sufficient to illustrate an operative apparatus.

In Figs. 10 and 11 I have shown a modified form of workpiece holder and carrying member, which consists in a concavo-convex body 61 similar to the body 40, but instead of connecting and mounting the blanks 44 in connection with the concave face of the body 61, they are mounted in connection with the convex face thereof and retained in place by keepers 62 secured to the body 61 by screws or bolts 63, the keepers 62 being reduced as shown at 64 to form recesses between the keepers and the body 61 to receive the end portions of the blanks 44 and a bottom plate 65 is secured to the body by screws 66 and provided with an extension 67 forming a seat for the blanks 44 and an L-shaped plate 68 is secured to the top of the body 61 by a plate or keeper 69 secured to the body 61 by screws or bolts 70, and one part 71 of the L-shaped plate 68 is adapted to bear on the uppermost blank 44 to hold the blanks in proper or firm position in and between the body 61 and keepers 62.

The form of workpiece holder and carrying member as shown in Figs. 10 and 11 is particularly designed for use in connection with lathes, in which event, one or more of said holders may be mounted on the turning table or rotary head of the lathe and a tool 72 may be secured in the tool post of the lathe the face of the tool being provided with cutting teeth 73 which will be the same as, or approximately the same as the teeth on one of the cutting faces 58 of the cutter 56. With this construction it will be understood that the tool 72 is held stationary, while the workpiece holder and carrying member is moved or rotated to cut the teeth in the blanks 44, and this operation is the reverse of that shown in Figs. 1 to 9 inclusive, and it will also be understood that the tool 72 in this form of construction is fed over the face or faces of the blanks 44 to cut the teeth longitudinally thereof.

In Fig. 12 of the drawings, I have shown another modification in which a flat oblong and rectangular body 74 is employed and keepers 74 are secured to the top face thereof adjacent to the ends of the body and the blanks 44 are secured to the top face of said body in the same manner as the connection of the blanks of the body 61 and body 40 as shown in Figs. 10 and 11 and 1 to 9 inclusive respectively. A plate 76 is secured to one side of the body 74 by screws or bolts 77 and serves as a backing for the blanks 44, while an L-shaped sheet metal plate 78 is secured to the other side of said body by screws or bolts 79 passed therethrough and through a plate or keeper 80, and the part 81 of the L-shaped plate 78 is adapted to bear on the outer blank 44 to hold said blanks or bind them between the plate 78 and the plate 76.

The form of holder shown in Fig. 12 is particularly designed for use in connection with planing machines, and employed in connection therewith is a cutter 82 which is mounted in a tool post of a planing machine, and said cutter will be the same or approximately of the same form as the tool 72 shown in Fig. 11, and the same will be moved in the direction of the arrows $x^2$ and $x^3$, Fig. 12, over the blanks 44 to cut the saw teeth therein as will be readily understood.

In Fig. 13 I have illustrated a modification designed for use in connection with a cutter similar to that shown in Figs. 1 to 9 inclusive, which consists in varying the form of the teeth in the alternate cutting faces 58 and for illustration the teeth on the cutting face marked $y$ in Fig. 8 of the drawings will be formed in the manner shown at $y^2$ in Fig. 13 of the drawings, while the teeth on the cutting face marked $y^3$ in Fig. 8 of the drawings will be formed in the manner shown at $y^4$ in Fig. 13, or the vertical depth of the teeth $y^4$ is less than the depth of the teeth $y^2$, and the parts $y^5$ of the teeth $y^4$ are at a different angle than the parts $y^6$ of the teeth $y^2$.

The object of providing the form of teeth in the cutting face 58 as illustrated in Fig. 13 is to produce a sharp tooth in the blanks 44 and the result of this operation is indicated in full and dotted lines in Fig. 14, where I have shown a part of a blank 44, and in said figure the teeth shown in full and dotted lines at $a$ illustrate the result of the operation of the teeth $y^2$ shown in Fig. 13 which will be on one of the cutting faces 58 of the tool 56, while the teeth shown in full and dotted lines at $b$, Fig. 14, illustrate the result produced by the teeth $y^4$ shown in Fig. 13 which would be on the alternate cutting faces 58 of the cutter 56, and the teeth $y^4$ form, as clearly indicated in Fig. 14, sharp points $c$ on the edges of the teeth of the saw produced from the blank.

The construction shown in the accompanying drawings is designed for use in cutting or manufacturing jewelers' saws or saw blades, the transverse dimensions of which are very small, and it will be understood that the details of the construction shown in Figs. 5 to 14 inclusive has been enlarged to a great extent in order to clearly illustrate the invention, but while I have shown certain details of construction for manufacturing what is known as jewelers' saw blades, it will be readily understood that my invention or the method herein employed for manufacturing jewelers' saw blades may be used in the manufacture of saw blades of various kinds and classes as herein before set out, and while I have shown a specific form of holder for supporting and carrying the blade blanks in machines of different kinds and classes, it will also be understood that my invention is not limited to this form of holder, and various changes in and modifications of the details of my invention herein shown and described may be made, within the scope of the appended claims, without departing from the spirit of my invention or sacrificing its advantages.

Having fully described my invention, what I claim as new and desire to secure by Letters Patent, is:—

1. In an apparatus of the class described, a workpiece supporting member, comprising an elongated body part having a concaved face therein, means for supporting in parallel relation thereto a plurality of saw blade blanks on the concaved face of said body part, and means connected with one side edge of the body part for holding said blanks in firm position.

2. In an apparatus of the class described, a workpiece supporting member, comprising an elongated body part, keepers arranged on the ends of the body part and between which and the body part is a space adapted to receive a plurality of saw blade blanks, and means secured to the longitudinal sides of the body part for holding said blanks in a rigid position.

3. In an apparatus of the class described, a workpiece supporting member comprising an elongated concavo-convex body part, and means for detachably connecting a plurality of saw blade blanks with the concave portion of said body part and for holding said blanks in rigid position.

4. In an apparatus of the class described, a workpiece supporting member comprising an elongated concavo-convex body part, means for supporting a plurality of saw blade blanks on one side face of said body part, and means for holding said blanks rigidly in connection with said body part and said first named means.

5. In an apparatus of the class described, the combination with a workpiece supporting member and means for supporting in facial contact therewith a plurality of workpieces, of a rotary tool cutter device consisting of a disk or wheel the periphery of which is divided into a plurality of transversely arranged cutter faces each having a plurality of obliquely extending cutter teeth thereon.

6. In an apparatus of the class described, the combination with a workpiece supporting member and means for supporting a plurality of workpieces in said member, of a rotary tool cutter device consisting of a disk or wheel the periphery of which is divided into a plurality of cutter faces having a plurality of obliquely extending cutter teeth thereon, the form and dimensions of the cutter teeth in the alternate cutter faces on said disk or wheel being different from that of the other cutter faces.

7. In an apparatus of the class described, the combination with a base or support, a main frame mounted to move transversely of said support, and a supplemental frame mounted to move longitudinally of the main frame, of a workpiece supporting member comprising an elongated concavo-convex body part, means for supporting workpieces on one side face of the body part, and means for holding said workpieces in rigid connection with said body part and said supporting means, the supplemental frame being provided with arc-shaped recesses adapted to receive the end portions of the body part of said supporting member whereby the workpiece supporting member may be supported in said supplemental frame.

8. The method of making saw blades which consists in stacking in a curved formation a plurality of blanks within a holder and subjecting one edge of the stacked blanks to the action of a rotary cutter.

9. The method of making saw blades which consists in stacking in a curved formation a plurality of independent blanks arranged face to face within a holder and subjecting the exposed edge of the blanks to the action of a transversely operating rotary cutter.

10. The method of making saw blades which consists in holding in a curved stacked formation a series of independent blanks and presenting the stacked blanks to the action of a transversely operating cutter.

11. The method of making saw blades which consists in presenting a blank to the cutting action of a transversely operating cutter and advancing the blank transversely of the cutter solely by the cutting operation of the cutter.

In testimony that I claim the foregoing as my invention I have signed my name in presence of the subscribing witnesses this 27th day of June 1918.

ADOLF KÖNIG.

Witnesses:
C. E. MULREANY,
H. E. THOMPSON.